United States Patent [19]
Premiski et al.

[11] Patent Number: 5,619,130
[45] Date of Patent: Apr. 8, 1997

[54] FASTENING A RING MEMBER ON A HUB MEMBER

[75] Inventors: Vladimir Premiski, Zuelpich-Buervenish; Friedel Lauscher, Kreuzau-Drove; Wilhelm Wehren, Kerpen-Blatzheim, all of Germany

[73] Assignee: Ford Motor Company, Dearborn, Mich.

[21] Appl. No.: 508,498

[22] Filed: Jul. 28, 1995

[30] Foreign Application Priority Data

Jul. 30, 1994 [DE] Germany ............ 44 27 098.4

[51] Int. Cl.$^6$ .............. G01P 3/44; G01P 3/488; B60B 27/00
[52] U.S. Cl. .................. 324/173; 324/207.22
[58] Field of Search .................. 324/173, 174, 324/207.22, 207.25; 73/488, 493, 494, 514.39; 301/105.1; 188/181 R; 384/448

[56] References Cited

U.S. PATENT DOCUMENTS

| | | | |
|---|---|---|---|
| 4,795,278 | 1/1989 | Hayashi | 384/448 |
| 4,940,937 | 7/1990 | Hattori | 324/207.22 |
| 5,053,656 | 10/1991 | Hodge | 324/207.22 |
| 5,166,611 | 11/1992 | Kujawa, Jr. et al. | 324/207.22 X |

FOREIGN PATENT DOCUMENTS

| | | |
|---|---|---|
| 0306850B1 | 3/1993 | European Pat. Off. . |
| 3703395 | 8/1988 | Germany .......... 324/173 |

*Primary Examiner*—Gerard R. Strecker
*Attorney, Agent, or Firm*—Frank G. McKenzie

[57] ABSTRACT

In an arrangement for fastening an annular member on a hub member, wherein the annular member (1) has a locking tab (14) formed on its inner surface which engages in an annular locking groove (13) formed on the outer circumference of the hub member (2). The annular member (1) is provided with a radially extending wing tab (8) for fixing non-rotatably to the hub member (2).

16 Claims, 2 Drawing Sheets

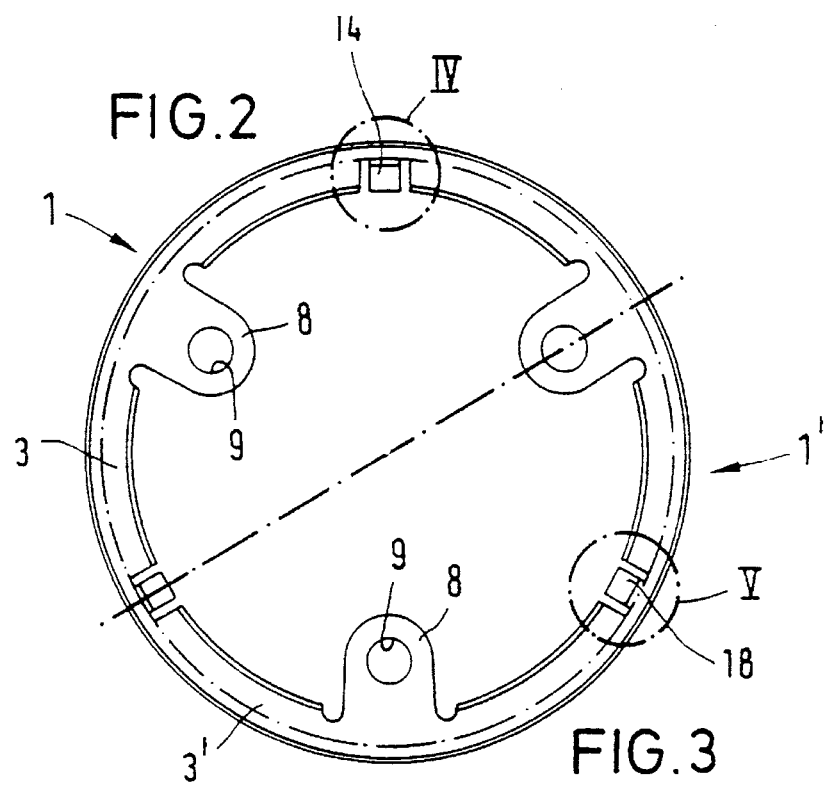
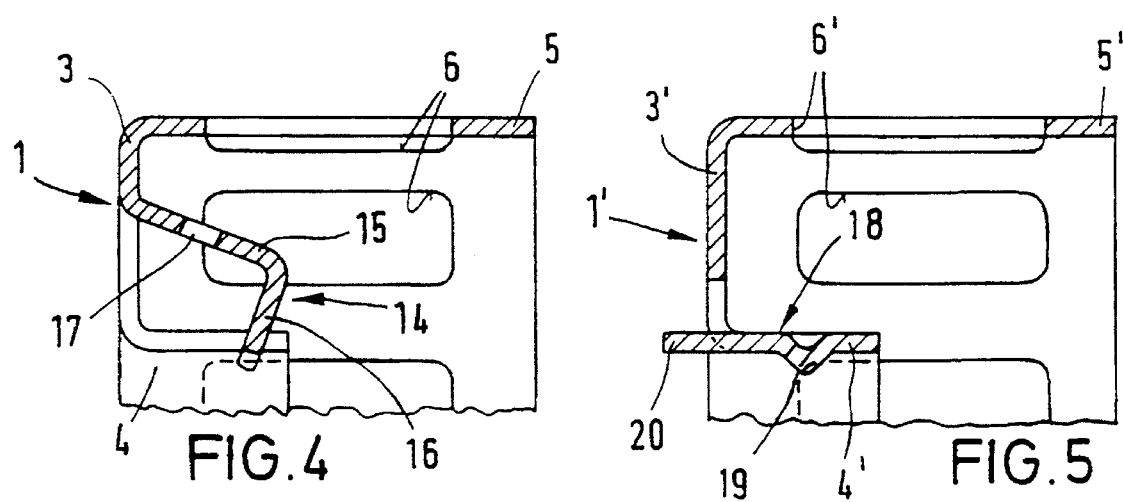

FASTENING A RING MEMBER ON A HUB MEMBER

FIELD OF THE INVENTION

The invention relates to an arrangement for fastening a ring member on a hub member, particularly for fastening a sensor ring on a hub member.

BACKGROUND OF THE INVENTION AND PRIOR ART

From European patent specification No. 0 306 850 an arrangement for fastening a sensor ring on a hub member is known wherein the sensor ring has on its inner circumference a locking edge which engages in an annular locking groove formed on the outer circumference of the hub member.

This known fastening arrangement has the disadvantage that the elastically engaged connection is not definitely located in the direction of rotation, so that if the components are subjected to vibration, gradual wandering of the sensor ring, which is only elastically engaged, can occur, whereby the desired signal output may be changed or disturbed.

From U.S. Pat. No. 4 795 278 a further fastening arrangement for a sensor ring on a hub member is known: various cross-sectional shapes and various fastening positions are proposed, but here, too, reliance is again essentially placed on fastening by frictional forces.

In this known fastening arrangement wandering of the sensor ring can again occur in the event of poor manufacturing tolerances and of vibration.

OBJECT OF THE INVENTION

It is an object of the invention to provide an improved arrangement for fastening a ring member on a hub member, more particularly for fastening a sensor ring on a hub member, such that a simple fastening with secure, rotation-proof entrainment is ensured while simple disassembly is nevertheless still possible in case of need.

SUMMARY OF THE INVENTION

This object is achieved, in accordance with the invention, if in an arrangement for fastening an annular member such as a sensor ring on a hub member wherein the sensor ring has a locking edge on its inner circumference which engages in an annular locking groove formed on the outer circumference of the hub member. The sensor ring has a U-shaped cross-section and is provided with at least one wing tab extending radially from its base with an opening for fixing non-rotatably on a projection on a base part on the hub member, and on the sensor ring, at least at three positions distributed around the circumference, substantially axially extending, cut-free locking tabs are provided which cooperate lockingly with the annular locking groove on the hub member.

By this means, besides a simple elastic locking fastening, rotation proof entrainment is ensured.

Advantageously the cut-free locking tabs have in their spring section an opening for insertion of a releasing tool, by means of which lifting the locking sections out is facilitated. Alternatively the cut-free locking tabs may be provided with a raised locking portion and with an axially extending handle by means of which lifting of the raised locking portions out of the annular locking groove is facilitated.

BRIEF DESCRIPTION OF THE DRAWINGS

The invention is described in more detail below, by way of example, with reference to an embodiment shown in the accompanying drawings, in which:

FIGS. 2 & 3 respectively show half views of two different embodiments of a fastening arrangement of a sensor ring shown in FIG. 1;

FIGS. 4 & 5 show in section, on a larger scale sections, the details of the locking fastening shown in the chain-line circles IV and V respectively.

DETAILED DESCRIPTION OF PREFERRED EMBODIMENTS OF THE INVENTION

Figure 1:
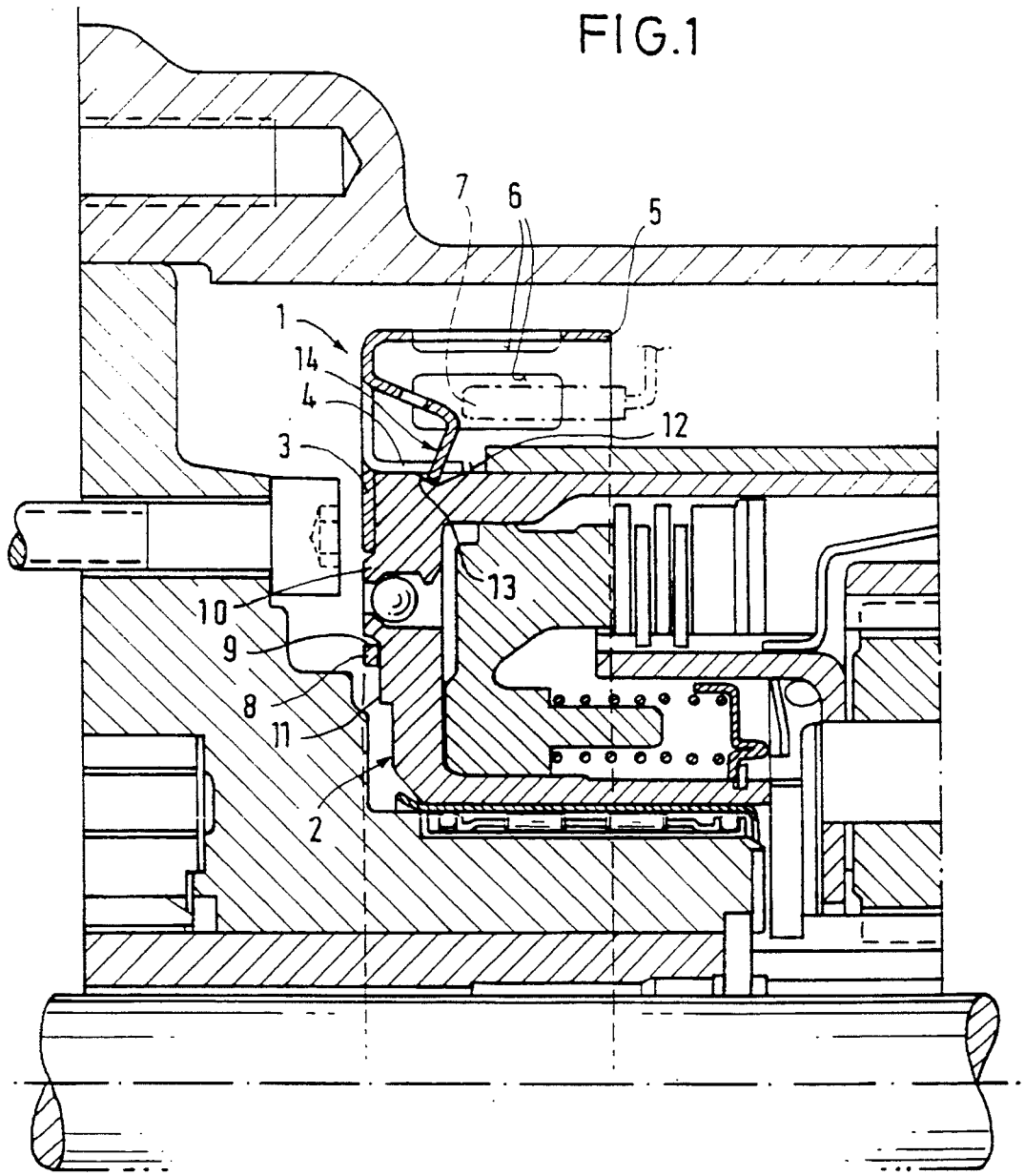
FIG. 1 shows a partial section through an automatic transmission having a fastening arrangement of a sensor ring on a hub member in accordance with the invention.

In the case of the arrangement shown in FIG. 1 for fitting a sensor ring 1 on a hub member 2, only the parts necessary for the understanding of the invention are provided with reference numerals.

In the embodiment shown by way of example the sensor ring 1 serves in an automatic transmission to determine the speed of rotation of the hub member 2, which in this case is a clutch brake drum arrangement for a planetary gear set.

The sensor ring 1 has an essentially U-shaped cross-section with a radially extending base 3 and an inner ring 4 and an outer ring 5, each extending axially. The inner ring 4 overlaps a part of the outer circumference of the hub member 2 while the outer ring 5 is provided with a plurality of openings 6, which can be detected and counted by a sensor 7 positioned adjacent the outer ring 5 as the openings 6 move past the sensor 7. Alternatively, the sensor ring 1 could have an L-shaped cross section with a radially extending base 3 and an inner ring 4. With the L-Section, openings 6 are provided in the radially extending portion of the base 3, instead of the outer ring 5 as discussed above in the preferred embodiment.

The radially extending base 3 is provided with at least one inwardly extending wing tab 8 in which an opening 9 is provided which cooperates with a corresponding projection 10 on a base wall 11 of the hub member 2 to produce a form-fitting, rotation-proof connection. Preferably, the base wall 11 projects generally radially at the end of the hub member 2. Alternatively, the wing tab 8 could engage a radial slot (not shown) provided in the base wall 11 of the hub member 2 to prevent rotation of the sensor ring 2. Alternatively, said wing tab 8 could engage an axial slot (not shown) in the outer circumference 12 of the hub member 2.

The hub member 2 is provided with an annular locking groove 13 on its outer circumference 12 adjacent the base wall 11. The groove 13 is overlapped by the inner ring 4 of the sensor ring 1. In the preferred embodiment, the groove 13 has a V-section as shown in FIG. 1.

As shown in FIG. 2, the sensor ring 1 is provided on its base 3 with preferably at least three locking tabs 14 distributed around its circumference, each tab 14 having an axially extending and a radially extending spring and locking section 15 and 16 respectively. As shown in FIG. 1, when the locking tabs 14 engage in the annular locking groove 13, the sensor ring i is secured against unintentional axial withdrawal after the sensor ring I has been pushed on to the outer circumference 12 of the hub member 2.

As shown in FIG. 4, the axially extending section 15 may be provided with an opening 17. By applying an expanding tool (not shown) to the openings 17 of the axially extending sections 15 shown in FIG. 4, the sensor ring 1 can be released from the hub member 2.

In the case of the embodiment shown in the lower part of FIG. 3 and FIG. 5, a further sensor ring 1' is shown which again has a substantially U-shaped cross-section with an axially extending inner ring 4' and an outer ring 5'. A plurality of openings 6' are again provided in the outer ring 5'.

In this embodiment locking tabs 18 consisting essentially of a locking cam 19 and a handle 20 and standing out at the transition between the base part 3' and the inner ring 4' are provided at at least three positions distributed around the circumference. Here, again, the sensor ring 1' is secured by simply pushing it axially on to the hub member 2 and engaging the locking cam 19 in the annular locking groove 13. As in the case of the first embodiment, rotation-proof entrainment is ensured by way of a wing tab 8 on the base part 3', preferably with a locking opening 9.

Although the invention has been described in connection with the arrangement of a sensor ring within an automatic transmission, the fastening in accordance with the invention can obviously also be used with advantage in the same way in other applications. Various changes and modifications may be made to the embodiments shown without departing from the scope of the invention as set forth in the appended claims.

What is claimed is:

1. An annular member for axial and rotational retention to a hub member having an outer surface with an annular groove and an end face, comprising:

an annular member having an annular inner surface positioned adjacent the outer surface of the hub and a means for releasably engaging the annular groove of the hub to prevent axial movement therebetween; and a tab means cooperating with said hub member for preventing rotation between the annular member and the hub.

2. The annular member of claim 1, wherein the tab means for preventing rotation comprises:

a wing tab on the annular member, said wing tab projecting radially inward from the inner surface of the annular member.

3. The annular member of claim 2, wherein the means for engaging the annular groove comprises:

a second surface on the annular member substantially perpendicular to the inner surface of the annular member, a first leg projecting from said second surface, said first leg extending generally axially; and a second leg projecting substantially perpendicular from said first leg, said second leg having a first end being releasably engagable with the annular groove of the hub.

4. An annular member for axial and rotational retention to a hub member having an outer surface with an annular groove and an end face, comprising:

an annular member having an annular inner surface positioned adjacent the outer surface of the hub, said annular member having a locking tab substantially coextensive with the inner surface, said locking tab having a locking cam for engaging the annular groove of the hub to prevent axial movement therebetween; and a tab means cooperating with said hub member for preventing rotation between the annular member and the hub.

5. The annular member of claim 4, wherein the tab means for preventing rotation comprises:

a wing tab on the annular member, said wing tab projecting radially inward from the inner surface of the annular member.

6. A sensor ring and hub assembly for axial and rotational retention of the sensor ring, comprising:

a hub having an outer surface, a first end, a radially extending surface at the first end, an axial projection extending from the radial surface of the first end, and an annular locking groove in the outer surface adjacent the first end;

a sensor ring having an inner surface positioned adjacent the outer surface of said hub, a means for releasably engaging the annular groove of said hub to prevent axial movement therebetween, a wing tab on said sensing ring projecting radially inward from the inner surface of said sensing ting, the wing tab further having a generally planar surface substantially parallel to the end surface of said hub, said planar surface having an aperture therein for engagement with said axial projection to prevent relative rotation between said sensor ring and said hub.

7. The sensing ring of claim 6, wherein said sensing ring has a U-Shaped cross-section, and the means for engaging said annular groove comprises:

a second surface, substantially perpendicular to said inner surface of said sensing ring, a first leg projecting from said second surface, said first leg extending generally axially; and a second leg projecting substantially perpendicular from said first leg, said second leg having a first end being releasably engagable with the annular groove of the hub.

8. The sensing ring of claim 6, wherein said sensing ring has a U-Shaped cross-section, and the means for engaging said annular groove comprises:

an sensing ring having an annular inner surface positioned adjacent the outer surface of said hub, said annular member having a locking tab substantially coextensive with the inner surface, and said locking tab having a locking cam for engaging the annular groove of said hub to prevent axial movement therebetween.

9. The sensing ring of claim 6, wherein said sensing ring has an L-Shaped cross-section.

10. A sensor ring and hub assembly for axial and rotational retention of the sensor ring, comprising:

a hub member having an outer surface with an annular groove and an end face;

an annular member having an annular inner surface positioned adjacent the outer surface of the hub and a means for releasably engaging the annular groove of the hub to prevent axial movement therebetween; and a tab means cooperating with said hub member for preventing rotation between the annular member and the hub.

11. The sensor ring and hub assembly of claim 10, wherein the tab means for preventing rotation comprises:

a projection on the hub, said projection projecting generally axially from the end face of the hub; and a wing tab on the annular member, said wing tab projecting radially inward from the inner surface of the annular member, said wing tab further having a generally planar surface substantially parallel to the end face of the hub, said planar surface having an aperture therein for engagement with said projection to prevent relative rotation between the annular member and the hub.

12. The sensor ring and hub assembly of claim 11, wherein the means for engaging the annular groove comprises:

a second surface on the annular member substantially perpendicular to the inner surface of the annular member, a first leg projecting from said second surface, said first leg extending generally axially; and a second leg projecting substantially perpendicular from said first leg, said second leg having a first end being releasably engagable with the annular groove of the hub.

13. The sensor ring and hub assembly of claim 11, wherein the means for engaging the annular groove comprises:

an annular member having an annular inner surface positioned adjacent the outer surface of the hub, said annular member having a locking tab substantially coextensive with the inner surface, said locking tab having a locking cam for engaging the annular groove of the hub to prevent axial movement therebetween.

14. The sensor ring and hub assembly of claim 10, wherein the tab means for preventing rotation comprises:

a slot provided in the end face of the hub;

a wing tab on the annular member, said wing tab projecting radially inward from the inner surface of the annular member, said wing tab engagably received with the slot on the hub to prevent relative rotation between the annular member and hub.

15. The sensor ring and hub assembly of claim 14, wherein the means for engaging the annular groove comprises:

a second surface on the annular member substantially perpendicular to the inner surface of the annular member, a first leg projecting from said second surface, said first leg extending generally axially; and a second leg projecting substantially perpendicular from said first leg, said second leg having a first end being releasably engagable with the annular groove of the hub.

16. The sensor ring and hub assembly of claim 14, wherein the means for engaging the annular groove comprises:

an annular member having an annular inner surface positioned adjacent the outer surface of the hub, said annular member having a locking tab substantially coextensive with the inner surface, said locking tab having a locking cam for engaging the annular groove of the hub to prevent axial movement therebetween.

* * * * *